Figure 1:
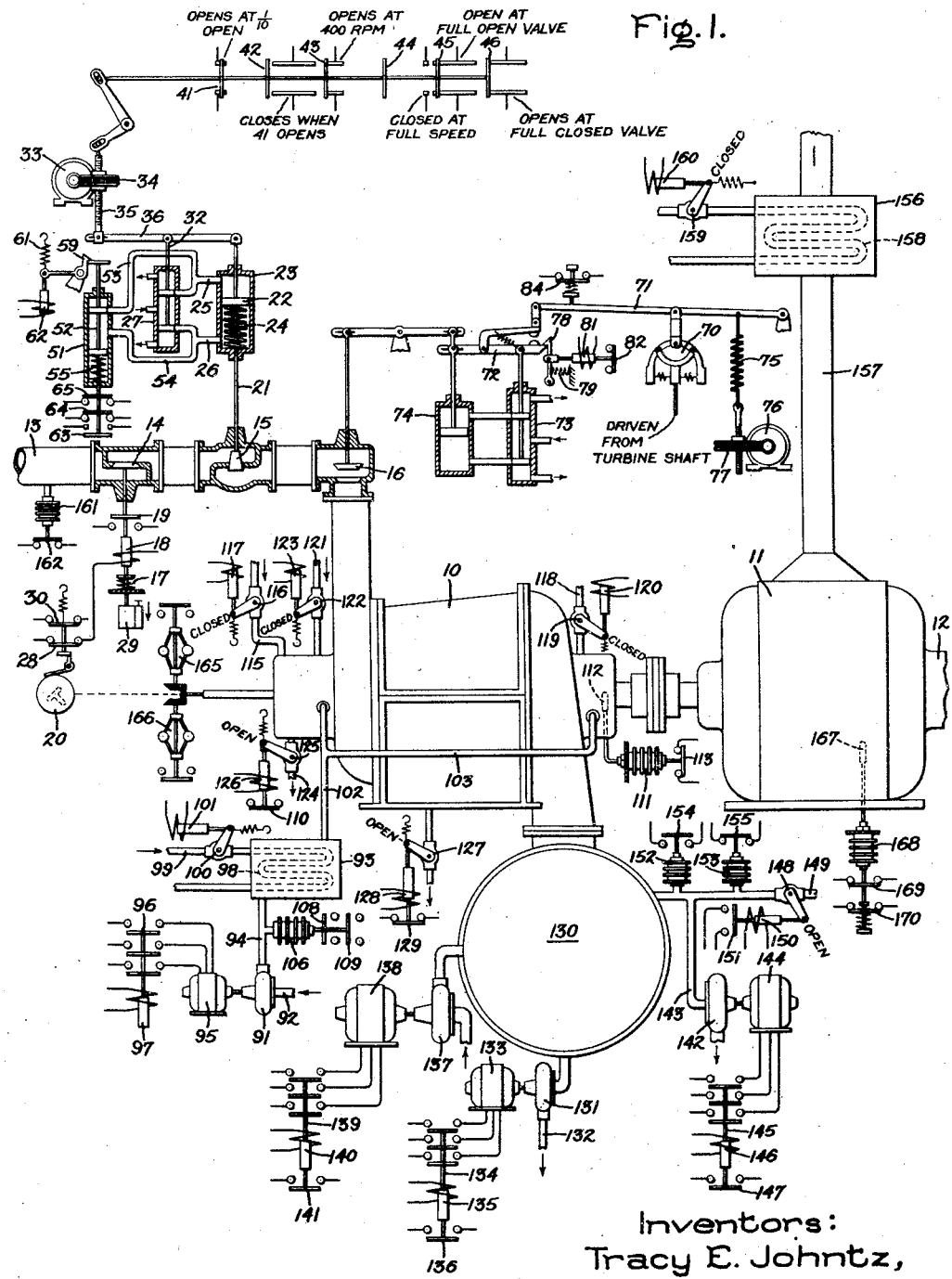

June 2, 1942.  T. E. JOHNTZ ET AL  2,285,208
AUTOMATIC TURBINE CONTROL SYSTEM
Filed April 10, 1940  5 Sheets—Sheet 2

Inventors:
Tracy E. Johntz,
Claude W. Place,
by *Harry E. Dunham*
Their Attorney.

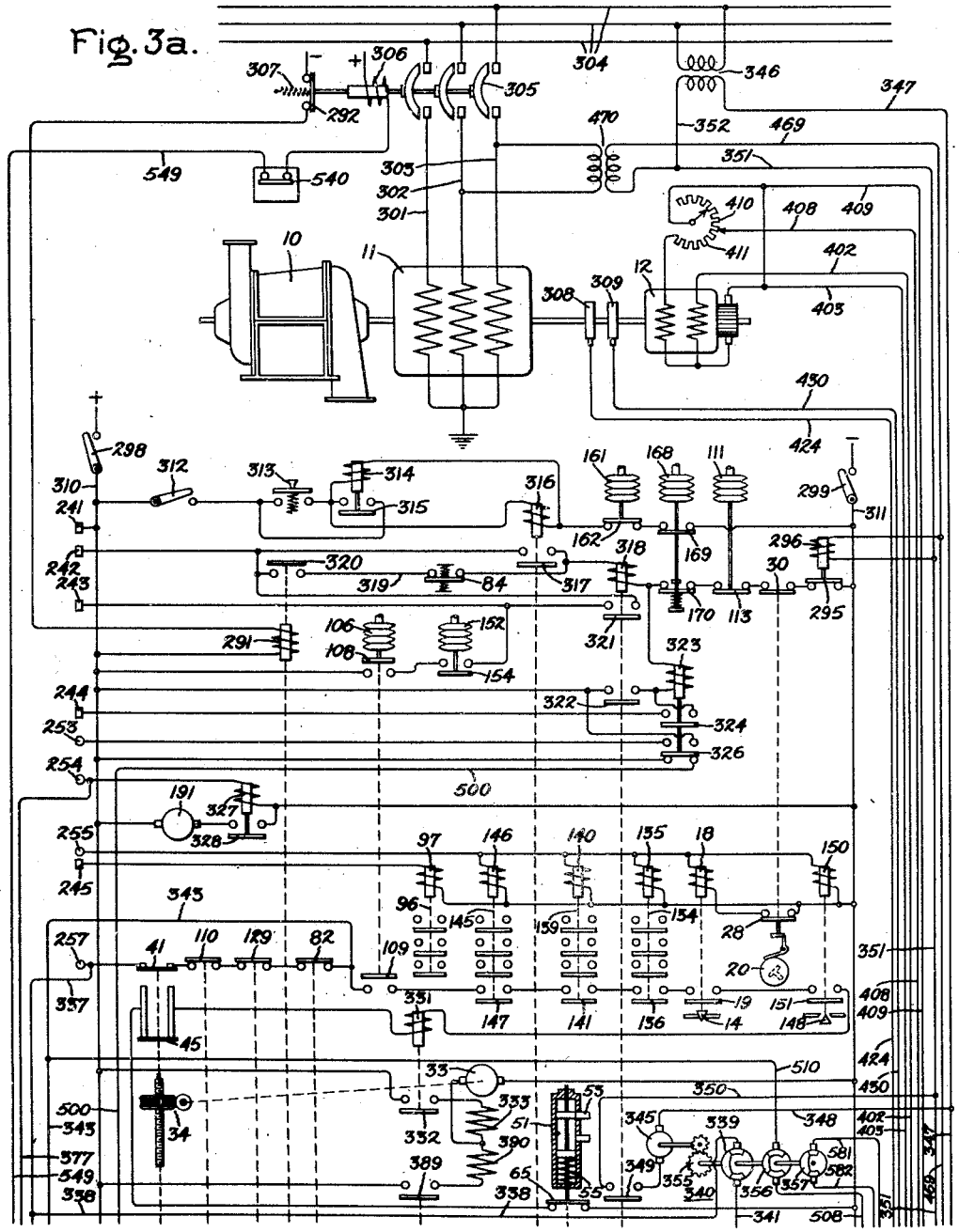

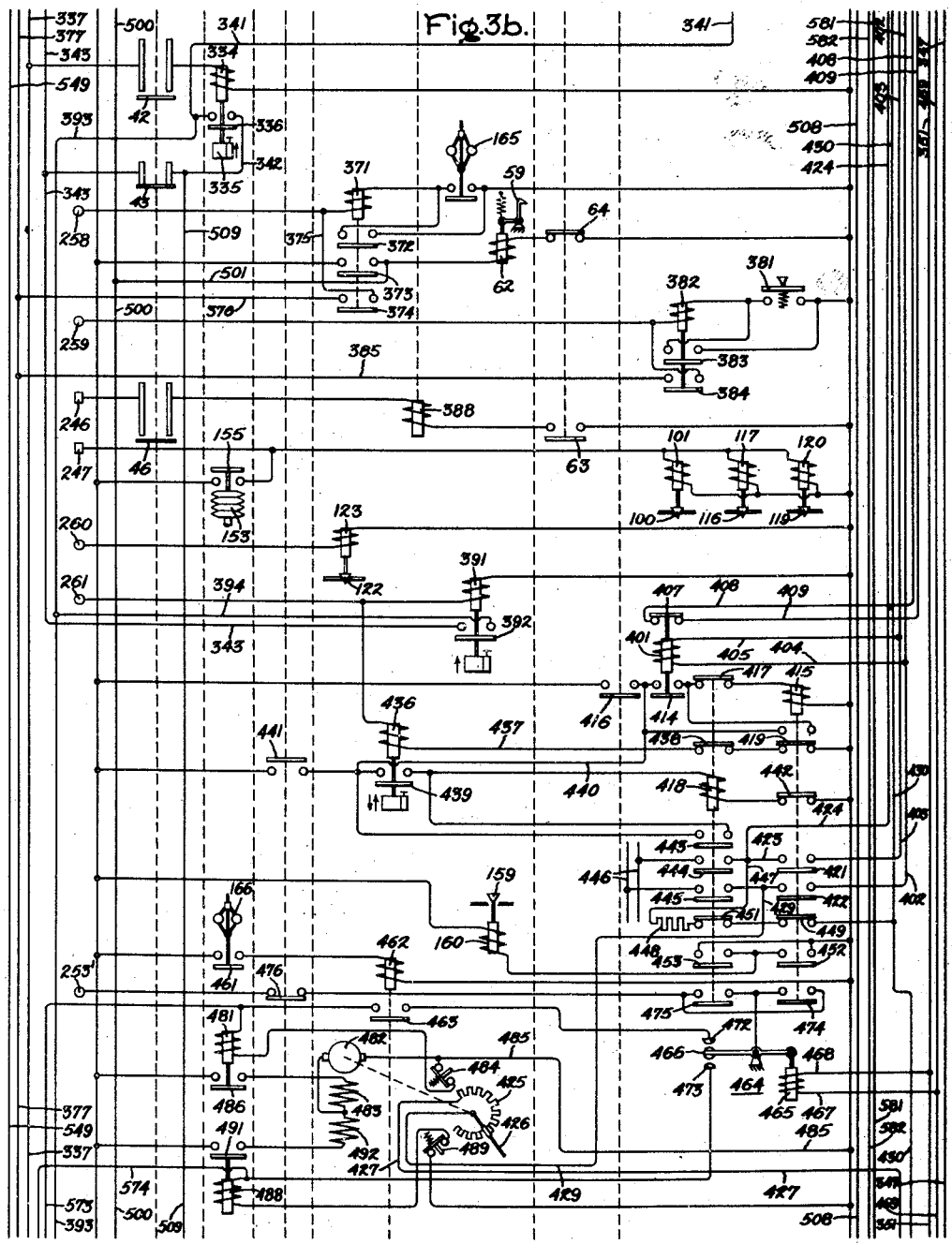

Patented June 2, 1942

2,285,208

UNITED STATES PATENT OFFICE 2,285,208

AUTOMATIC TURBINE CONTROL SYSTEM

Tracy E. Johntz, Wilmette, and Claude W. Place, La Grange, Ill., assignors to General Electric Company, a corporation of New York Application April 10, 1940, Serial No. 328,848

28 Claims. (Cl. 290—40)

This invention relates to prime mover-generator plants and more particularly to control systems therefor.

The starting and stopping of prime mover power plant units entails many operational steps which must be performed in a proper sequence, the continuity of the sequence steps being determined by the conditions pertaining to the completion of the last preceding step. In the case of elastic fluid turbine power plants, the starting and control of various pieces of apparatus auxiliary to the turbine must be coordinated with the control of the turbine valves in a definite relation in order that the turbine will function properly and to avoid injury thereto. It is desirable to provide such a power plant for automatic control whereby proper starting and stopping of the power plant unit in minimum time may be insured and also in order that the unit may be controlled by a supervisor located at a desired distance therefrom. It is therefore an object of this invention to provide a reliable system for automatically controlling a power plant including a prime mover, a generator, and appurtenant auxiliary apparatus.

More specifically, it is an object of the invention to provide a new and improved system for controlling a prime mover power plant whereby the prime mover may be automatically started from standstill, through a plurality of steps of speed increase up to full normal running speed.

A further object of this invention is to provide a new and improved system for starting a prime mover power plant including various auxiliary apparatus the control of which is coordinated with the control of the main prime mover so that they are thrown into operation at the proper time during the starting sequence of the power plant. A more specific object is to provide the control system with means for automatically shutting down the power plant and the auxiliary apparatus, the various operational steps being performed in proper order so as to preclude injury to the prime mover.

Still another object of the invention is to provide a system for automatically starting a prime mover power plant from standstill and bringing it up to full normal speed through a plurality of steps with provision for arresting the automatic progression of the starting sequence for purposes of checking the operation of the power plant at the conclusion of each successive step. A more specific object is the provision of means for automatically disrupting the starting sequence in the event of an abnormal condition obtaining with respect to the turbine or any of the auxiliaries and in certain emergencies, to cause a shut down of the plant.

Still another object of the invention is to provide a new and improved control system for automatically starting a prime mover dynamo plant in which the prime mover is brought up to a speed corresponding to the frequency of the line to which the generator is to be connected and the generator then automatically synchronized and connected to the line. A more specific object is the provision of means for connecting the dynamo of the power plant for independent load and voltage control following the connection of the dynamo to the line.

In accordance with the illustrated embodiment of our invention we provide a control system for an elastic fluid turbine prime mover power plant including an electric generator adapted to be connected to station buses. Various motor driven auxiliary units associated with the power plant and other apparatus forming a part thereof, such as the various turbine valves, are controlled by the system during both starting and stopping operations in a predetermined sequence of steps, various interlocks and other checking devices being provided so that in the event of a failure of any particular piece of apparatus to operate properly, the progression of the starting cycle will be immediately arrested, or the power plant will be immediately shut down. In starting, the continuity of the automatically controlled sequence of steps is disrupted at a number of points in order to give a floorman an opportunity to check on the operation of the power plant apparatus. Means are provided so that the floorman, if everything is in proper order, may allow the continuation of the starting operation. After the prime mover power plant has been brought to full running speed, the frequency of the generator is matched with the line frequency and then synchronized and connected to the line. After such connection is effected, the control of the prime mover is transferred to the usual speed governor, while the control of the generator voltage and load is transferred to the station supervisor. Control of the prime mover is maintained at all times by various protective devices some of which, responsive to extreme, abnormal conditions, will effect the immediate shut down of the prime mover, while others responsive to pre-emergency conditions such as excessive energy or reactive component loads will effect first a gradual unloading of the generator and disconnection thereof from the line and thereafter the gradual shut down of the prime mover and various auxiliary apparatus in proper sequence.

For a consideration of what we believe to be novel and our invention, attention is directed to the following description and the claims appended thereto taken in connection with the accompanying drawings.

Figure 2:
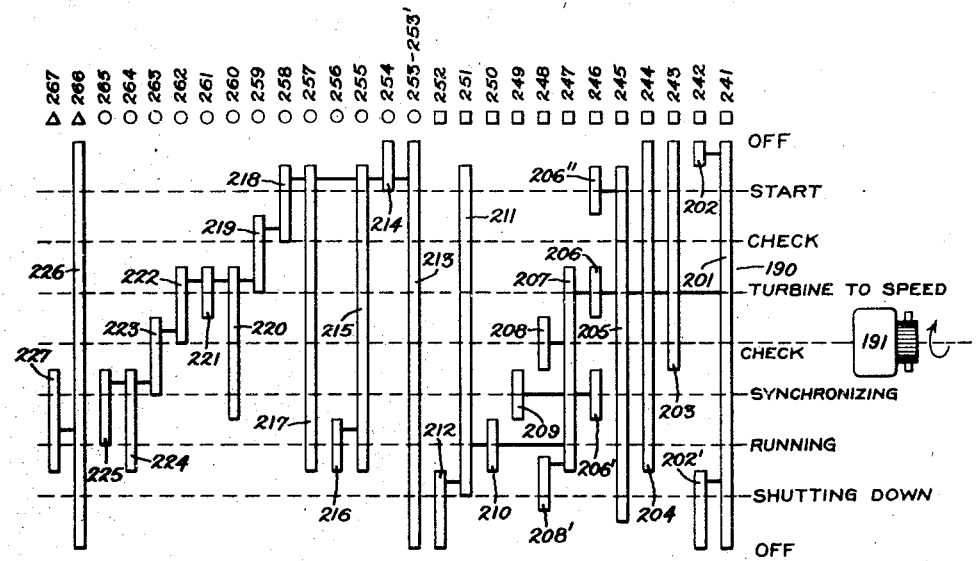
Figure 4:
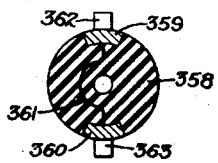
Figure 3C:
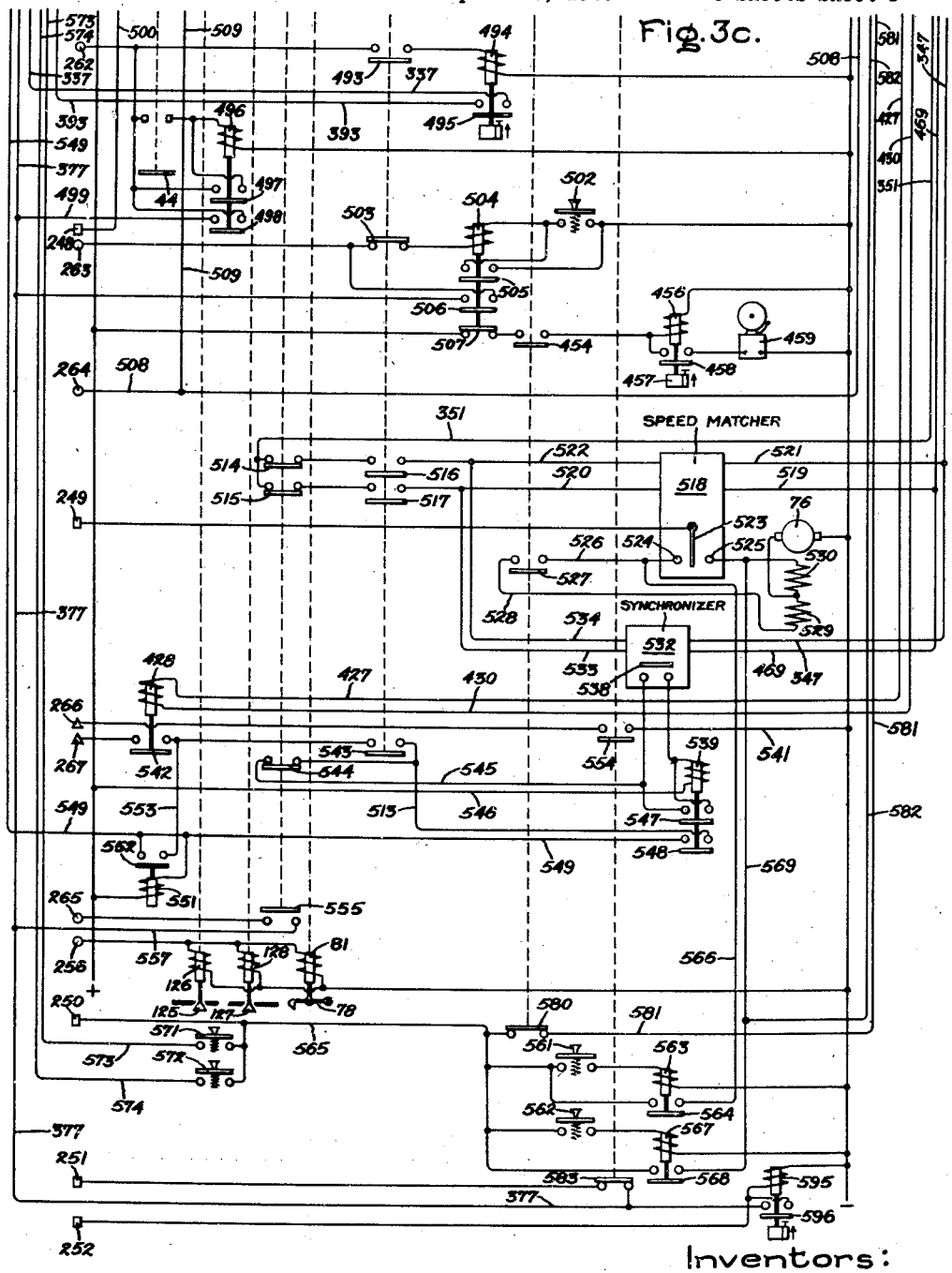

In the drawings Fig. 1 is a diagrammatic layout of a prime mover power plant as adapted for automatic control; Fig. 2 is a developmental layout of the contact arrangement for the drum controller embodied in the control system; Figs. 3a, 3b, and 3c are a schematic wiring diagram for the control system of the power plant and auxiliary apparatus; and Fig. 4 is a detail view of one part of the apparatus embodied in the control system.

In order to simplify the description of the control system as much as possible, diagrammatic symbols have been used wherever possible to represent well known elements, the nature and operation of which elements are well known by those skilled in the art. For further convenience in showing the electrical connections, simple solenoids are frequently shown for closing and holding closed, certain electrical connections, valves and the like, relying upon either a spring or gravity to cause the opening thereof or vice versa. It is obvious, of course, that sound engineering may demand the use of means more positive in its action such as, for example, an electric motor. Such a motor would be connected to the device through suitable gearing and be energized for driving the device to the operating position and then be automatically deenergized. To return the device to the previous condition, the motor would be energized for rotation in the opposite direction until automatically stopped upon the device reaching the predetermined condition. It is obvious that any such minor changes may be made in the control scheme in order to incorporate desired principles of engineering design by any one skilled in the art.

Referring now to the drawings, in Fig. 1 is shown a typical power plant or power plant unit, comprising an elastic fluid turbine 10 coupled for driving an electric current generator 11 and an exciter 12. The turbine 10 is adapted to be supplied with operating fluid through the conduit 13, the flow of operating fluid being controlled by an emergency stop valve 14, a throttle valve 15, and a speed governor control valve 16. The stop valve 14 is normally biased to the closed position by suitable means indicated by spring 17 and adapted to be actuated to the open position by a suitable motor means represented by a solenoid 18. Interlock contacts 19 are arranged for actuation with the stem of the stop valve to close a circuit, indicating the opened condition of the stop valve, for reasons as will be explained in connection with the control system. While the motor operator 18 is shown in this instance as comprising a simple solenoid device, it is obvious that any well known suitable motor is represented thereby. This stop valve during normal turbine operation is in the opened position and is adapted to be released for closing upon the occurrence of any predetermined abnormal condition of operation of the power plant system. The turbine shaft may be provided with a suitable emergency speed governor, indicated at 20, which may be adapted for breaking the circuit of the solenoid 18 by opening contacts 28 upon the occurrence of a predetermined excess speed condition of the turbine. Upon the deenergization of solenoid 18, the spring 17 will initiate the movement of the valve to the closed position. The emergency speed governor is arranged also to open other contacts 30 during emergency conditions.

A suitable dash pot means indicated at 29 may be provided for preventing the steam pressure which acts upon the unbalanced valve from slamming it too hard against the seat. The trigger of the emergency governor 20 may be reset by any suitable means or manually after a thorough inspection of equipment following a tripping thereof.

The throttle valve 15 is preferably of a type having a relatively wide range of adjustment particularly near the closing end of its stroke so that it is not unduly critical in the slightly opened positions when the unloaded turbine is gradually accelerated to normal running speed. Such valves are well known in the art and are indicated in the drawings by the long tapered disk. The throttle valve 15 is adjustable through various positions from fully closed to the fully opened condition for accelerating the turbine 10 from standstill to full running speed by a number of progressive steps. The throttle valve 15 is connected by a stem 21 to a piston 22 of a suitable hydraulic operating motor 23, a spring 24 being arranged between the lower surface of the piston and the lower end of the motor cylinder for biasing the valve to the closed position. Operating fluid is admitted to the servomotor 23 through port connections 25 and 26 and a suitable pilot valve 27. A pair of spaced apart valve heads is arranged upon the stem 32 of the valve 27 and controls the flow of fluid to and from the hydraulic motor 23 in a well known manner. The pilot valve is adapted for adjustment by a suitable reversible electric pilot motor 33 which is coupled by gearing 34 and screw threaded spindle 35 with one end of the floating lever 36. Lever 36 is connected at an intermediate point with the valve stem 32 of the pilot valve and at the opposite end with the stem of the hydraulic motor for returning the pilot valve to the normal position after movement by pilot motor 33.

A plurality of throttle valve limit switches are arranged for adjustment simultaneously with the raising or lowering movements of spindle 35 upon the operation of pilot motor 33 for controlling various circuits of the control system in accordance with the position of adjustment of the throttle valve 15. The limit switch 41 is normally closed and opens at about the one-tenth open position of the throttle valve 15 which condition will admit operating fluid from the supply conduit to the turbine 10 sufficiently for warming it to operating temperature without rolling it. The limit switch 42 is normally open but is adapted to close when the switch 41 opens. The limit switch 43 is normally closed but opens at a point corresponding to a partially opened position of the throttle valve which is the condition for admitting operating fluid to the turbine for driving it at a no-load speed of, for example, 400 R. P. M. The limit switch 44 is normally open and closes only at the fully opened position of the throttle valve. The limit switch 45 is normally closed and opens only at the fully opened position of the throttle valve. The limit switch 46 is normally closed and opens only at the fully closed position of the throttle valve.

Means are provided for tripping the throttle valve to the closed position at any time independent of the condition of the operating motor 33 and the pilot valve 27. A trip valve 51 is provided having a pair of spaced apart heads arranged upon an operating stem 52. The trip valve is connected by pipes 53 and 54 with the connections 25 and 26 in such a manner that when the valve is tripped, fluid may flow from the motor cylinder above piston 22 through pipes 53 and 54 into the motor cylinder below piston 22, the closing of the throttle valve 15 being effected by the spring 24. The trip valve stem is biased in the upward or tripping direction by a spring 55 arranged between the lower head and the end wall of the trip valve casing. The trip valve is adapted to be restrained in the position shown by means of a suitably arranged pivoted latch 59 engaging the upper end of the valve stem 52. The latch 59 is normally biased to the engaging position by a spring 61 and is actuable to the valve releasing position by means of a solenoid 62. A number of position switches 63, 64 and 65 are provided on the valve stem 52 for controlling various electrical circuits in accordance with the various positions of the trip valve 51 as will be described later.

The operating mechanism for the turbine governor control valve 16 may be of any suitable type adapted to be regulated during the operation of the turbine by means of a speed responsive governor. In the drawings, the speed governor 70, adapted to be driven from the turbine shaft, is connected for adjusting a pivoted beam 71. At its movable end the beam is connected to the split type floating lever 72 which, in a well known manner, through the pilot valve 73 and hydraulic operating motor 74 effects the adjustment of the control valve 16. Load adjustment of the governing mechanism is effected by means of a suitable synchronizing spring 75 connected at one end to the governor beam 71, the tension of the spring being adjustable by a suitable reversible electric motor 76 through gearing 77. During the starting period of the turbine the lower half of the split floating lever is latched in a position corresponding to the no-load, normal speed position of the control valve 16.

It is well understood that the governor regulated valve of a turbine is usually of the sectional admission type. During starting of the turbine it is desirable that steam be admitted thereto through a single section of openings which may be effected by holding the floating lever in a predetermined position as by a latch mechanism. The latch 78 is normally biased to the operative position by a spring 79 and is adapted to be actuated to the releasing position by a solenoid 81 during the running operation of the turbine. In the shutting down operation of the turbine, when solenoid 81 is deenergized, the latch 78 is remade when the governor beam is adjusted to the no-load position by action of spring 79.

Contacts 82 are provided which are arranged to be opened upon the latch 78 being moved to the inoperative position. It is to be understood that during the starting cycle the supply of operating fluid to the turbine is controlled by means of the throttle valve 15 and not by the control valve 16. After the turbine has been brought up to running speed, the control is taken over automatically by the speed governing apparatus, the floating lever is unlatched, and the throttle valve 15 is shifted to the fully opened position. Contacts 84 are provided on the governor beam 71, which are closed during load positions of the governor beam and adapted to be moved to the open position upon the beam 71 being moved to the no-load position by the governor. In the schematic layout of Fig. 1, separate valves 14, 15 and 16 are shown for the sake of simplicity but in an actual embodiment it may be desirable to combine two or more of these valve mechanisms into a single unit. For example, valves 14 and 15 may be replaced by a single valve gear connected for dual control by the mechanism shown for operating valve 15 as well as by the emergency trip governor 20 shown for operating valve 14. Such modification of the schematic arrangement may be readily made by one skilled in the art.

The turbine is provided with a lubricating oil system comprising a pump 91 which is connected to a suitable supply reservoir (not shown) by conduit 92 and is adapted to discharge into the oil cooler 93 through conduit 94. The pump is driven by a suitable electric motor 95 the energization of which is controlled by a suitable switch 96 operable by solenoid 97. A heat exchanger coil 98 is arranged within the cooler 93 and adapted to be supplied with cooling fluid through conduit 99, the flow therethrough being controlled by a normally closed valve 100 which is arranged to be actuated to the opened position by a solenoid 101. From the cooler 93 oil is distributed to the various bearings through conduit 102 and branch conduit 103, oil being drained from the bearings back to the supply reservoir through suitable drain connections (not shown). It is obvious that the same lubricating system may be connected for supplying lubricant to the bearings of the generator and exciter. A device 106 responsive to oil pressure is connected to the conduit 94 and is provided with a pair of contact arms 108 and 109 which are adapted to close circuits simultaneously upon the occurrence of a predetermined suitable oil pressure condition.

A device 111 connected to a bulb 112 arranged within a turbine bearing housing is responsive to the bearing temperature and is arranged to open circuit the contact arm 113 upon the occurrence of a predetermined abnormal bearing temperature condition. While only one of these devices is illustrated, it is obvious that it represents any number of similar devices responsive to the temperatures of all the various turbine and generator bearings the contacts of which may be connected in series.

Water is adapted to be supplied to the high pressure turbine packing through conduit 115, a normally closed valve 116 being arranged therein, the valve being adapted to be actuated to the opened position by means of a solenoid 117. Similarly, water is supplied to the low pressure packing through the conduit 118, the flow therethrough being controlled by a normally closed valve 119 which valve is adapted to be actuated to the opened position by a solenoid 120. Steam is also adapted to be supplied to the high pressure packing through another conduit 121, a normally closed valve 122 being arranged therein and adapted to be actuated to the opened position by means of a solenoid 123. A high pressure packing leak-off connection 124 has a normally open valve 125 arranged therein which valve is adapted to be closed by solenoid 126. Contact 110 is provided on solenoid 126 for indicating the opened condition of the valve.

At the beginning of the starting cycle, the turbine of course is cold, and when steam is first admitted thereto it will condense within the casing. One or more suitably arranged and normally open drain valves 127 are provided for draining such condensate from the interior of the turbine. Such valves may be operated to the closed position by a solenoid 128, contacts 129 being provided for indicating the open position of the valves.

The turbine is adapted to exhaust into a condenser 130, condensate being drawn therefrom by means of a pump 131 and discharged through connection 132 to the hot well (not shown). The pump 131 is adapted to be operated by means of a suitable electric motor 133, the energization of which is controlled by a switch 134 operable by solenoid 135. The switch is provided with an interlock contact arm 136 which is adapted to be closed simultaneously with the closing of the switch 134. Cooling water is supplied to the heat exchanger tubes of the condenser by means of a pump 137, which pump is adapted to be driven by a suitable electric motor 138 the energization of which is controlled by a switch 139 operable by solenoid 140. Auxiliary contacts 141 of the switch are arranged to be closed simultaneously with the closure of the switch. Just prior to the starting up of the turbine, air is withdrawn from the condenser and the turbine by means of an air exhaust pump 142 suitably connected by conduit 143 with the condenser chamber. The pump 142 is arranged to be driven by a suitable electric motor 144, the energization of which is controlled by a suitable switch 145 operable by solenoid 146. Interlock contacts 147 are provided on the switch mechanism 145 which contacts are adapted to be closed simultaneously with the closure of the switch. A normally open valve 148 is arranged in a branch conduit 149 communicating between the condenser chamber and atmosphere, which valve is adapted to be actuated to the closed position by a solenoid 150. Interlock contacts 151 are provided which are adapted to close a control circuit when the vacuum breaker valve 148 is in the closed position. Pressure responsive devices 152 and 153 are provided for indicating predetermined pressure conditions obtaining within the turbine and condenser chamber, the devices being provided with contacts 154 and 155, respectively. The device 152 is adjusted to close its contacts 154 upon the occurrence of normal running vacuum obtaining in the turbine. The contacts 155 of device 153 are adjusted so that they are closed upon any vacuum obtaining within the turbine and opened at approximately atmospheric pressure occurring therein.

A suitable cooling fluid, such as air or hydrogen, is adapted to be supplied to the generator through the cooler 156 and conduit 157. A suitable cooling medium is circulated through the heat exchanger coils 158 within the cooler, the flow of cooling medium being controlled by the normally closed valve 159, which valve is adapted to be actuated to the opened position by means of a solenoid operator 160.

A steam pressure responsive device 161 is connected to the supply conduit 13 ahead of the stop valve 14. The device 161 is provided with contacts 162 which are adapted to be closed upon a predetermined steam pressure existing in the supplying conduit and to be opened in the event that the steam pressure drops below a predetermined minimum value corresponding to the minimum pressure required for the proper operation of the turbine.

A number of speed responsive switches are provided on the turbine shaft in addition to the emergency over-speed device 20. The device 165 is arranged for closing a set of contacts at a turbine speed of about one R. P. M. The device 166 is adapted to close its contacts at a speed corresponding to about 98% normal speed of the turbine. These devices control certain steps in the starting cycle as will be later described in connection with the control system. It is obvious that the devices 165 and 166 may be substituted by a single device having two sets of contacts operable to the closed position at the above mentioned turbine speeds respectively.

The generator 11 may also be provided with suitable protective devices for indicating any abnormal condition of operation thereof. For example, means may be provided for causing the shut down of the power plant at any time either during the starting cycle or during the normal running operation thereof upon the occurrence of a predetermined excess temperature condition of the windings thereof due either to an overload or to a failure of the ventilating system, or any other cause. Such means are represented in the drawings by a bulb 167 arranged within the interior of the generator and connected to an expansible unit 168 having contacts 169 which are adapted to be moved to the open circuit position upon the occurrence of a slightly overheated condition of the generator windings, and contacts 170 which are adapted to be opened upon excessive overheating of the windings. Generator over voltage protective means are also provided as will be pointed out in the description of the control system.

With regard to the automatic control system, the starting and stopping of the turbine power plant is at all times under the control of the station supervisor who may be located on the floor of the powerhouse or in a remote control room. The control system to be described contemplates that the supervisor, if located in a remote control room, be assisted in the starting and stopping of the power plant by a floorman whose function it is to observe the occurrence of any accident, pipe leak of importance, or any one of the possible unanticipatory conditions that must be left to human observation and not to a planned system of control. In order to insure that the floorman is on the job and is properly attending to his duties, the control system is adapted for certain timely operations to be performed by the floorman. Thus, the starting cycle is broken up into a plurality of steps each of which must be initiated by the floorman presumably after he has determined that the preceding step of the starting cycle has been properly completed and that everything is in apparent readiness for progressing with the next step.

Certain connections for the control system are effected in a step by step sequence through a motor driven drum controller having a plurality of operative contact making positions, the controller in each of such positions establishing circuits for effecting or initiating a predetermined series of power plant operations. Various interlocks are provided in the circuit of the drum operating motor so that the drum cannot be advanced for effecting the succeeding steps unless all of the apparatus of the preceding step operated in their intended manner. Referring to Fig. 2, a development of the drum controller 190 is shown in a diagrammatic form having one series of segments 201 to 212, a second series 213 to 225, and a third series 226 to 227, inclusive, arranged and connected substantially as shown. The drum 190 carrying the various sets of segments is adapted to be rotated by steps in a direction as indicated by an electric motor 191, so that there is a mechanical interlocking of various functions of the control in a definite sequence as regards time. Thus there is no possibility of an operation being prematurely initiated due to circuit imperfections, and after the function has been performed, of its being repeated or undone until such release is determined by another physical location of the controller. A plurality of fingers are adapted to be engaged by the various segments at various operative steps of the controller, the fingers 241 to 252, inclusive, being arranged to be engaged by the segments 201 to 212, respectively, the fingers 253 to 265, inclusive, to be engaged by the segments 213 to 225, respectively, and fingers 266 and 267 to be engaged by the segments 226 and 227, respectively. In the schematic wiring diagram of Fig. 3 only the contact fingers of the drum controller are shown along the left-hand side and the connections between the various fingers may be checked for the various positions of the drum by reference to Fig. 2.

Referring now to the wiring diagram Fig. 3, (A, B, C) the electrical connections for the generator 11 and the exciter 12 are shown in an elementary manner, the generator having armature leads 301, 302 and 303 adapted to be connected to the station buses 304 by a circuit breaker 305. The circuit breaker 305 may be of any suitable type adapted to be operated to the closed position by an electrical motor represented by the solenoid 306 and biased to the open position by suitable means indicated by the spring 307. The field winding leads are brought out to the slip-rings 308 and 309 through which the excitation current is supplied.

The apparatus of the control system is supplied with power from a suitable source connected through switches 298 and 299 to the leads 310 and 311 designated as positive and negative, respectively. For sake of brevity in the description, these leads will be merely referred to as the positive and negative supply leads. When it is desired to start up the power plant the supervisor closes the start and stop control switch 312 and the floorman, indicating that everything is in readiness, presses button 313 which initiates the first step of the starting cycle. While the start indication is here provided by manual control switches, it will be obvious that the start indication, as well as the stop indication, may be provided by any suitable switch device receiving an operating impulse from any suitable control source. Relay 314 picks up its arm 315 locking itself in around the contacts of the button 313. An energizing circuit is completed for the winding of the control relay 316 through the contacts of a number of protective devices which are included in this circuit and which will cause the generator, after it is connected to the line, to be unloaded slowly until the condition no longer exists, or if it continues, until the plant is shut down. Among such devices may be the steam pressure responsive device 161 and the generator temperature responsive device 168. Contacts of other pre-emergency protective devices may, of course, be arranged in this circuit. The contacts 162 of the device 161 are normally closed and will be opened in the event that the pressure of the steam supply for the turbine drops below a predetermined value. The contacts 169 of the device 168 are normally closed and will be opened in the event that the windings of the generator become slightly overheated. As the contact arm 317 of the device 316 closes, an energizing circuit is completed for the master control relay 318 which circuit extends from the positive of the source of supply through the drum controller finger 241, segments 201, 202, finger 242, through the closed contacts 317, the winding of relay 318, and through the contacts of the protective devices which will cause the immediate shutdown of the unit in case of accident while the machine is running. Among such protective devices may be the generator temperature responsive device 168, having contacts 170 which will open upon excessive heating of the generator windings. The contacts 113 of the bearing temperature responsive device 111, contacts 295 of the generator overvoltage responsive device 296, and contacts 30 of the emergency governor mechanism 20 may also be arranged in this circuit as well as contacts of other suitable emergency protective devices. The contacts 317 of the control relay 316 are bridged when the power plant is in normal running operation through line 319, contacts 84 associated with the speed governor beam 71, and contacts 320 of the circuit breaker position responsive device 291 for reasons as will become apparent as the description proceeds. The device 291 is energized through a set of auxiliary contacts 292 on the main circuit breaker 305. The contacts 292 are closed when the circuit breakers are open, and open when the circuit breakers are closed.

Segments 202 and 202' of the drum controller engage the associated finger 242 only in the off and shutting down positions of the drum, respectively, so that the master control relay 318 cannot be moved closed except in these two positions of the drum. The relay 318 seals itself closed through its contact arm 321, the drum contact finger 243 and segment 203. In the running position of the drum, when neither segments 202 nor 203 are in a contact making position, the relay 318 is sealed in through the contacts 154 of the vacuum responsive device 152 and the contacts 108 of the bearing oil pressure responsive device 106. It is understood that initially the contacts of the latter two devices are open since running vacuum has not as yet been established within the turbine, and the lubricating oil pump not yet started. During the normal running operation of the turbine, in the event that either the vacuum or the oil pressure fails, the master relay 318 will be deenergized and the power plant will be immediately shut down.

The contact arm 322 of the relay 318 completes a circuit for the relay 323 which relay seals itself in through its contact arm 324 and the finger 244 and segment 204 of the drum controller. When the relay 323 moves its contact arm 326 to the upper position an energizing circuit is completed for the drum controller segment 213. This energizing circuit extends from the positive of the source of supply through the closed upper contacts 326 of relay 323 to the drum controller finger 253 and segment 213. The drum controller motor 191 is thereupon energized to rotate the drum to the starting position. This energizing circuit extends from the energized segment 213 through the segment 214, the controller finger 254, the winding of relay 327, to the negative supply line. As the relay 327 picks up, its contact arm 328 connects the motor 191 across the supply lines. As soon as the drum is rotated to the extent that the segment 214 disengages the contact finger 254, the relay 327 will be deenergized thereupon stopping the motor 191 and drum in the "start" position.

In this position of the drum controller, circuits will be established for energizing various auxiliaries including the air pump, water pump, condensate pump, stop valve, and the vacuum breaker valve. These circuits extend from the energized segment 215 through the contact finger 255, to the operating solenoids 146, 140, 135, 18, and 150, connected in parallel, to the negative supply line. The air, water, and condensate pump motors 144, 138, and 133, respectively, will be started, the stop valve 14 will be moved to the opened position, and the vacuum breaker valve 142 will be moved to the closed position.

Another circuit will be completed simultaneously from the energized segment 205 of the drum controller through contact finger 245 for energizing the switch operating solenoid 97 which, in turn, will effect the energization of the oil pump motor 95. When suitable oil pressure is built up, contacts 109 of the pressure responsive device 106 will move to the closed circuit position completing a circuit for causing the admission of live steam to the turbine for warming it to operating temperature. The control circuit for causing the operation of the throttle valve 15 to the first open position extends from the energized segment 217 through the contact finger 257 through the closed limit switch 41 of the turbine throttle valve operating mechanism, the closed contacts 110 and 129 of the high pressure packing leak-off valve 125 and the drain valve 127, respectively, indicating that these valves are open, the closed contacts 82 of the governor latch 78, the closed contacts 109 of the oil pressure responsive device 106, the closed contacts 147, 141, and 136 of the switches 145, 139, and 134, respectively, and the closed contacts 19 of the stop valve 14, the closed contacts 151 of the vacuum breaker valve 148, the winding of relay 331, the closed contacts of the throttle valve limit switch 45, the closed contacts of the trip valve position switch 65, to the negative supply line. As the relay 331 picks up, its contact 332 will connect the pilot motor 33 and its directional winding 333 directly across the supply lines and cause opening of the throttle valve 15 until the limit switch 41 is moved to the open circuit position. This is a position of the throttle that will admit steam for heating the turbine to operating temperature but not sufficient to start it rolling.

The heating period of the turbine is measured by a suitable time delay relay 334 provided with a restraint device indicated at 335. While the restraint device is indicated as being a single dashpot, it is obvious that any other suitable device is indicated thereby. Since the warm up period may cover as much as two hours, it may be desirable to use a clockwork or motor driven timing device instead of a dash pot. It is equally obvious that the action of this device may be modified by means responsive to the turbine temperature so that in the event the turbine is shut down for only a brief period, it may be restarted again with little or no time delay while the turbine is still hot.

At the same time that the limit switch 41 opens, the limit switch 42 will close which will complete an energizing circuit for the time delay relay 334. After a predetermined time, as measured by the setting of the restraint device 335, sufficient for warming the turbine has expired, the contacts 336 will close completing a circuit to open the throttle valve slowly to the turbine starting or rolling position. This circuit is from the previously energized contact finger 257 of the drum controller through lines 337 and 338, through the intermittent switch 339 of the tapping device 340, line 341, the contact 336 of the relay 334, line 342, the closed throttle valve limit switch 43, line 343, through the closed interlock contacts of the various auxiliary devices and winding of relay 331 to the negative supply line 311 as previously described.

The tapping device 340 comprises a small electric motor 345 which may be energized from any suitable power source such as the station buses 304, through the transformer 346. The energizing circuit may be traced from the right-hand terminal of the secondary winding of the transformer 346 through lines 347, 348, the motor 345, the closed contact 349 of the master control relay 318, lines 350, 351 and 352 to the left-hand terminal of the transformer secondary winding. The motor is adapted for driving through suitable speed reducing gearing 355 a plurality of intermittent switches 339, 356, and 357 for intermittently completing a plurality of corresponding circuits. Each of the intermittent switches may comprise a disk 358, see Fig. 4, of insulating material, having a pair of diametrically opposite segments 359, 360 connected together as at 361. As the disk is slowly rotated, a circuit is intermittently completed between the brushes 362 and 363. The periods of circuit making may be varied by shifting one of the brushes, or by varying the length of the segments. It will become obvious as the description proceeds that the tapping device 340 may be substituted by any other suitable device performing a similar function.

As the switch 339 intermittently energizes relay 331, the pilot motor 33 is correspondingly energized to tap the throttle open relatively slowly. When the turbine starts to roll, the low speed switch 165 will close its contacts to energize the relay 371 through the contact finger 258 and drum controller segment 218. The relay 371 will seal itself in through the closure of its contact 372 which establishes a circuit around the contacts of the speed switch 165. As the contact 373 of the relay 371 moves to the closed circuit position, the latch tripping solenoid 62 for the throttle valve trip valve 51 is energized through the closed position switch 64. As the latch 59 is moved to the releasing position, the trip valve 51 will move upwardly under force of spring 55, uncovering the port of the pipe 53 allowing operating fluid to circulate around the piston 22 of the throttle valve operating motor 23. Under the force of the spring 24 the throttle valve 15 will be moved to the closed position. When the valve 51 is tripped, the position switches 64 and 65 are opened while the position switch 63 is closed. The latch tripping solenoid 62 is deenergized upon the opening of the position switch 64.

The closed contacts 374 of the relay 371 will effect the energization of the drum controller motor 191 to rotate the drum to the next, or first "check" position. This control circuit extends from the energized drum segment 218, through contact finger 258, connection 375, the closed contacts 374 of relay 371, lines 376, 377, winding of relay 327, to the negative supply line. As the relay 327 picks up, the drum controller motor 191 will be connected across the supply lines and will rotate the drum until segment 218 disengages the contact finger 258.

At this point, the automatic progression of the starting operation is interrupted to interpose a manual check by the floorman to indicate that the auxiliaries are functioning properly, that the turbine operated smoothly, and that everything is in order for bringing the turbine through the next succeeding stages. If the floorman is satisfied in these and other respects, he will press a button 381 to energize the manual check relay 382. It is obvious that the manual check button may be substituted by any suitable automatic checking devices well known in the art, such as devices responsive to excessive vibration, shaft eccentricity, or rubbing of the internal turbine parts. In such event, the contacts of the button 381 represent the series contacts of any such automatic devices which will not close unless the operating conditions are proper. The relay 382 will seal itself in by the closure of its contact 383 which completes a circuit around button 381. Its closed contact 384 will effect the energization of the drum controller motor 191 to advance the drum for bringing the turbine through the next step of the starting cycle. This control circuit extends from the energized segment 219 through the contact finger 259, contact 384 of the relay 382, lines 385, 377, winding of relay 327 to the negative supply line. As the relay 327 picks up, the drum controller motor 191 will be connected across the line, which will operate the drum until the segment 219 disengages the contact finger 259. This position of the drum will effect connections for bringing the turbine to speed.

The throttle valve trip mechanism will first be reset by the energization of the throttle valve adjusting motor 33 for operation in the reverse direction. This control circuit will extend from the energized segment 206 through contact finger 246, throttle valve limit switch 46, the winding of relay 388, the closed contact of the position switch 63 to the negative supply line. As the relay 388 picks up, its contact 389 will complete an energizing circuit for the reverse directional winding 390 of the throttle valve pilot motor 33. The lower end of the plunger 35 will engage with the upper end of trip valve stem 52 and drive it downwardly until it is engaged by the latch 59. At this position of the trip valve, the position switch 63 and limit switch 46 will both be moved to the open circuit position thereby deenergizing the relay 388 and stopping the motor 33. The position switches 64 and 65 will be closed as trip valve 51 is reset. The throttle valve limit switch 41 will also be closed at this time and the previously described circuit will be completed for relay 331 which will energize winding 333 of pilot motor 33 to operate the throttle valve to the warming up position when the limit switch 41 will be reopened and limit switch 42 reclosed. As switch 42 closes, relay 334 is energized, and its contact 336 closes after the time delay. As described above, the throttle valve pilot motor 33 will be intermittently energized through the intermittent switch 339 and the throttle valve will be slowly tapped open again. This time, however, the opening of the throttle valve will continue until the limit switch 43 opens. The low speed switch 165 will be ineffective for energizing the trip coil 62 now because in the present position of the drum, the contact finger 258 is disengaged from its segment 218 and hence relay 371 will remain deenergized. The switch 43 is adjusted to open at a position of the throttle valve corresponding to some intermediate turbine speed, for example, about 400 revolutions per minute.

It will be noted that contact finger 247 was energized by its associated segment 207 simultaneously with the energization of finger 246. The solenoids 101, 117 and 120 are energized for opening the lubricating oil cooling water valve 109 and the water valves 116 and 119 to the high and low pressure turbine packings, respectively. The controller segment 207 and finger 247 are bridged by the contact 155 of the condenser vacuum responsive device 153 which device is so adjusted to maintain water in the packings until vacuum becomes atmospheric on shutting down. It is to be understood that the device 153 does not close its contact until normal running vacuum condition obtains within the condenser. A circuit is also established through segment 220 and finger 260 for energizing the solenoid 123 and opening the valve 122 so as to admit steam to the turbine high pressure packing.

Another circuit was also established by the last shift of the drum controller from segment 221, through the contact finger 261 for energizing the time delay relay 391. At the end of this time delay which allows the turbine a definite time to warm up operating at 400 R. P. M., the relay 391 closes its contacts 392 establishing a circuit around the limit switch 43, the opening of which stopped the throttle valve in the 400 R. P. M. position, to cause the throttle valve to be opened further to allow the turbine to come up to speed. This circuit may be traced from the energized contact finger 257, through lines 337, 338, intermittent switch 339, lines 341, 393, 394, closed contact 392 of relay 391, line 343, the closed interlocks of the various auxiliaries, relay 331, limit switch 45, position switch 65 to the negative supply line. Due to the intermittent energization of this circuit by switch 339, the throttle valve will be slowly tapped farther in the opening direction.

When the turbine has come up to about 75% speed, which will be a relatively short time after the closure of the relay 391, the voltage of the exciter 12 will normally be sufficient for connecting it to the field winding of the generator 11. The winding of relay 401 directly connected across the exciter buses 402 and 403 through connections 404 and 405 is so adjusted that it will pick up and close its contacts upon the occurrence of a predetermined suitable exciter voltage. In the deenergized condition of relay 401, its contact arm 407 closes a circuit through lines 408 and 409 cutting out a portion 410 of the exciter shunt field resistance 411. The exciter field and hence, the voltage, will thus tend to pick up rapidly upon the increase of turbine speed. As relay 401 picks up and opens the contact 407, the full normal resistance will be inserted in the exciter shunt field circuit.

As relay 401 closes its contact 414 an energizing circuit is completed for the winding of the generator field contactor 415. This circuit extends from the positive supply line through the closed contact 416 of the master control relay 318, the closed contact 414 of relay 401, the closed contact 417 of the generator auxiliary field contactor 418, the winding of the contactor 415 to the negative supply line. Contact arm 419 of contactor 415 completes a locking circuit for contactor 415 around contact 414 of relay 401. The field contactor arms 421, 422 connect the exciter 12 to the generator field winding slip-rings 308 and 309. One side of the excitation circuit extends from one exciter terminal through line 403, contactor arm 421, connection 423, line 424 to generator slip-ring 308. The other side of the excitation circuit extends from the second exciter terminal through line 402, contactor arm 422, line 429, rheostat arm 426, field rheostat 425, line 427, the winding of field failure responsive relay 428, line 430, to the generator slip-ring 309.

If for some reason or other, the exciter voltage does not build up as it normally should within a predetermined time, provision is made for automatically connecting an auxiliary source of excitation to the generator field winding.

Simultaneously with the energization of the previously described time delay relay 391, a second time delay relay 436 is energized by a circuit extending from the energized drum controller segment 221, contact finger 261, winding of relay 436, line 437, contact 438 of the contactor 418, contact 419 of the contactor 415 in its lower position to the negative side of the source of supply. If proper voltage of exciter 12 is present and relay 401 picks up, then the field contactor 415 will be energized, contact 419 will be raised to its upper position and time delay relay 436 will be deenergized before it picks up. Assume, however, that at the end of the delay period of relay 436, which is somewhat longer than the period of relay 391, the potential of exciter 12 has failed to build up and that the relay 401 and hence also field contactor 415 remains deenergized. The time delay relay 436 closes its contact 439 thereby establishing an energizing circuit for the auxiliary field contactor 418. The energizing circuit for the latter extends from the positive of the source of supply through the closed contact 416 of the master control relay 318, line 440, the closed contact 439 of the time delay relay 436, the winding of the contactor 418, the closed contacts 442 of the field contactor 415 to the negative of the source of supply. Upon the pick-up of the auxiliary contactor 418, its contact 417 open circuits the winding of the main field contactor 415 to preclude a later connection of the exciter to the field winding of the generator. The contact 438 of the auxiliary contactor also rises to deenergize the time delay relay 436 while the contact 443 of the auxiliary contactor closes to establish a holding circuit for the auxiliary contactor around the contact 439 of the time delay relay 436 before it drops out. The contactor arms 444 and 445 connect the auxiliary source of excitation, indicated by buses 446, to the generator field through lines 424 and 429.

The contact 441 of the circuit breaker position indicating device 291 is in the open circuit position at this time. After the generator is connected to the line this contact will be closed for reasons as will be described in connection with the description of the shutting down operation.

Prior to the connection of excitation thereto, the generator field is shunted by a discharge resistance 448. The resistance circuit extends from line 424, through line 447, resistance 448, arms 451 and 449 of contactors 418 and 415, respectively, to line 430. Upon the pick-up of the exciter field contactor 415 the contact 449 moves to the open circuit position whereas upon the pick-up of the auxiliary field contactor 418 the contact 451 moves to the open circuit position, either of which will break the shunt circuit including the resistance 448.

Upon the connection of the generator field winding to either the exciter 12 or the auxiliary source of excitation, the supply of cooling water to the generator ventilating air cooler 156 will be initiated. The operating solenoid 160 for the water flow control valve 159 will be energized by a circuit extending from the positive of the source of supply to the winding of the solenoid 160 through either of the closed contacts 452 or 453 of the field contactors 415 or 418, respectively, to the negative of the source of supply.

At about 98% turbine speed, the speed switch 166 will close its contact 461 to connect the winding of relay 462 across the supply lines. As the relay 462 picks up its arm 463, the contact making voltmeter, generally indicated at 464, will be connected to commence the adjustment of the generator voltage. The contact making voltmeter may be of any suitable type and is illustrated in a diagrammatic manner as comprising a voltage responsive element 465 which is connected across the generator leads so as to actuate its movable contact making arm 466 in accordance with the generator voltage. As indicated, the winding of element 465 is connected through leads 467 and 468, lines 351 and 469 to the secondary winding of the potential transformer 470, the primary of which is in turn connected to the generator leads 302 and 303. The contact making arm 466 is floatingly arranged and is adapted to engage with either of a pair of oppositely arranged fixed contacts 472 and 473.

The contact making arm 466 of the voltmeter is energized upon the pick-up of either of the field contactors 415 or 418 through their contacts 474 or 475, respectively. The circuit extends from the contact finger 253' of the drum controller through the contactor 476 and through either of the closed contacts 474 or 475 to the voltmeter contact making arm 466. Assume now, for example, that the generator voltage is below the desired value, or line voltage, and that the excitation is to be increased to raise the generator voltage. The contact arm 466 will then be actuated to engage with the fixed contact 472 thereby completing an energizing circuit for the contactor 481 which picks up to effect the energization of the reversible rheostat adjusting motor 482 through the directional field winding 483. The circuit for the winding of contactor 481 extends from the contact finger 253' of the controller through the closed contact 476, either of the contacts 474 or 475 of the field contactors, through the floating contact arm 466 of the voltmeter, through the closed contacts 463 of the relay 462, the winding of the contactor 481, through the limit switch 484 and line 485, to the negative of the source of supply. As the contactor 481 picks up, its arm 486 completes the circuit for the field winding 483 of the motor 482. The motor 482 will slowly rotate the movable arm 426 of the rheostat in a counterclockwise direction increasing the excitation current until the generator voltage reaches the desired predetermined value at which time the floating arm 466 of the voltmeter 464 will disengage the fixed contact 472. If, due to some abnormal condition, the movable arm of the rheostat 425 should reach its limit of travel before the contact arm of the voltmeter disengages the fixed contact 472, the rheostat motor 482 will be deenergized by the movement of the limit switch 484 by rheostat arm 426 to the open circuit position, thereby deenergizing the contactor 481. Assuming that the generator voltage should rise above the predetermined value, the floating arm of the contact making voltmeter will engage with the fixed contact 473 thereby completing an energizing circuit for the contactor 488 which will reverse the direction of rotation of the rheostat motor 482. This energizing circuit will extend from the energized voltmeter arm 466 through the winding of the contactor 488, through the limit switch 489, to the negative of the source of supply. As the contactor 488 picks up its arm 491, the motor winding 482 will be energized causing the motor and the movable arm of the rheostat 425 to be rotated in a clockwise direction increasing the circuit resistance until the generator potential has been decreased to the desired value or, in the unusual case, until the rheostat arm engages with the limit switch 489, thereby stopping the driving motor.

When the previously described relay 462 picked up, a second contact arm 493 thereof effects the energization of a time delay relay 494 through a circuit extending from the segment 222 of the control drum through the finger 262, and the closed contact 493 to the negative supply line. The dashpot, or other restraining device, of the time delay relay 494 is so adjusted that the relay will not close its contact until after the turbine is up to full normal speed and is under control of its speed governor 70. When the time delay relay 494 picks up, its contact 495 connects lines 337 and 393, which establishes a short circuit across the intermittent switch 339 of the tapping device 340. The throttle valve is then opened rapidly to the full open position and the position switch 44 of the throttle valve operating mechanism moves to the contact making position energizing the relay 496. The relay 496 seals itself in upon the closure of its arm 497 which establishes a circuit bridging the limit switch 44. A second arm 498 of the relay 496 completes a circuit for advancing the controller to the end of the segment 222 or to the second "check" position. This circuit extends from the energized finger 262, through closed contact 498 of relay 496, connection 499, line 377, drum motor control relay 327, to the negative of the source of supply.

As the segment 208 of the drum controller engages with the contact finger 248, the throttle valve trip coil 62 is energized through lines 500, 501 causing the closure of the throttle valve as previously described. The turbine will slow down giving the floorman an opportunity to check the operation of the various auxiliaries for the preceding step of the starting cycle. If everything is in order the floorman will depress the key 502. When the turbine speed has dropped to such a value below 98% that the speed switch 166 moves to the open circuit position, the relay 462 will be deenergized allowing its contact arm 503 to move to the circuit closing position. When this occurs, an energizing circuit will be completed for the manual check relay 504 which circuit will extend from the drum segment 223, the contact finger 263 through the closed contact 503, winding of the manual check relay 504, the contact of the push button station or key 502, to the negative of the source of supply. As the manual check relay 504 picks up, its arm 505 will establish a circuit around the key 502 to lock the manual check relay in the energized position.

The second arm 506 of relay 504 will complete a control circuit for effecting the advancement of the drum controller to the end of segment 223 or to the "synchronizing" position.

Suppose that some unforeseen condition has unduly delayed the progression of the starting cycle up to this point making it desirable that the attention of the station supervisor be directed to such fact. Provision is made so that if the manual check button 502 is not depressed within a certain time after the starting operation is initiated, a signal will be given. When relay 316 picked up at the commencement of the starting cycle, its arm 454 closed to complete an energizing circuit extending from the positive supply line through arm 507 of relay 504, for the winding of time delay relay 456. The restraint device 457 is adjusted so that the relay contact arm 458 will not be permitted to close until a predetermined time following the initiation of the starting cycle as measured by the time normally required for bringing the turbine up to full running speed and indicated by the advancement of the drum to the second "check" position. In the event that the operation of the turbine has not progressed in a normal manner within this period, the contact 458 will close completing a circuit for the signal 459 which may be a bell, light or other suitable device.

But assuming that the progression was normal and that button 502 was depressed advancing the drum to the "synchronizing" position, then the valve operating mechanism is first reset preparatory to the moving of the throttle valve 15 again to the fully opened position. A circuit is completed by the drum controller in its new position extending from a segment 208" through finger 246, position switch 46, contactor 388, trip valve position switch 63, to the negative of the source of supply. The contactor 388 closes its arm 389 to energize the directional winding 390 of the motor 33 which, as previously described, lowers the stem 35 which, in turn, resets the trip valve 51. As the trip valve is reset, the position switch 63 opens to deenergize the contactor 388 and to stop the motor 33. The trip valve position switches 64 and 65, of course, are reclosed as the trip valve is reset. The controller segment 224 and contact finger 264 complete a circuit extending through lines 508, 509, the position switch 43, line 343, the various auxiliary interlocks for energizing the contactor 331. The throttle valve control motor 33 is thereby continuously energized through its winding 333 and effects rapid opening movement of the throttle valve 15 until it reaches the 400 R. P. M. position, when the position switch 43 opens. The opening of the position switch 43 disrupts the continuous energization of the throttle valve control motor which motor will thereafter be intermittently energized through the intermittent switch 356 of the tapping device 340. This energizing circuit will extend from the drum controller finger 264 through line 508, the intermittent switch 356 of the tapping device 340, line 510, line 343, through the interlocks of the various auxiliary devices to the winding of the control contactor 331. The intermittent switch 356 is so adjusted that it will effect an opening movement of the throttle valve to the full open position at a rate faster than would the intermittent switch 339 yet not fast enough to harm the turbine. It will be noted that during this step, the excitation will remain connected to the generator field, since once either of the field contactors 415 or 418 is energized, it is sealed in the operative position. When the turbine again reaches 98% speed, the speed switch 166 and the associated auxiliary relay 462 will close. At about this turbine speed, the governor 70 will automatically take over the control of the turbine speed through the regulation of the valve 16, and the throttle valve 15 is moved to the inoperative or full open position at which time limit switch 45 opens to deenergize the motor 33.

The turbine is now operating at full normal speed under the control of the speed governor 70 and everything is in condition for matching the speed of the turbine with the frequency of the line to which the generator is to be connected. The closed contacts 514 and 515 of the circuit breaker position responsive device 291 and the closed contacts 516 and 517 of the auxiliary contactor 462 complete energizing circuits for the speed matcher 518. The speed matcher 518 may be of any suitable type, a number of such devices being well known in the art, one of which, for example, is fully described in the Patent No. 1,843,788 issued February 2, 1932, to Harold T. Seeley and assigned to the General Electric Company, the assignee of the present application. Such devices commonly embody one element which is adapted to be energized with one potential and a second element adapted to be energized with the second potential which is to be matched with the first. A floating contact arm is energized by a differential component of force which is proportional to the differential in the frequency of the two potentials being matched. One circuit which supplies the speed matcher 518 with the generator potential extends from one terminal of the potential transformer 470 through line 469, connection 519, the speed matcher 518, line 520, the closed contacts 517 and 515 of the devices 462 and 291, respectively, and through line 351 to the other terminal of the potential transformer 470. The second circuit which supplies the speed matcher with line potential extends from one terminal of the potential transformer 346 through line 347, connection 521, the speed matcher 518, line 522, the closed contacts 516 and 514 of the devices 462 and 291, respectively, and through lines 351 and 352 to the other terminal of the potential transformer 346. The speed matcher 518 regulates the synchronizing motor 76 of the turbine governor to bring the generator to the correct speed for synchronizing. The regulating circuit for the motor 76 is made through the drum controller segment 209, contact finger 249, the intermittent contact arm 523 of the speed matcher 518, through either of the fixed contacts 524 and 525 to the directional windings of the motor 76. When the intermittent contact arm 523 is in engagement with the fixed contact 524, the energizing circuit is completed through line 526, the closed contact arm 527 of the control relay 316, line 528, through field winding 529 of the motor 76 to the other supply line. When the contact arm 523 engages with the fixed contact 525, the directional winding 530 of the motor 76 is energized.

When the speed of the generator has been adjusted so as to correspond with the frequency of the line voltage, the synchronizer 532 will effect the connection of the generator to the line through the circuit breaker 305. The synchronizer 532 is connected in parallel with the speed matcher 518 through lines 533, 534, and 469, 347. The automatic synchronizer 532, examples of which are well known in the art, effects the closing of the circuit breaker 305 between the generator 11 and the station buses 304 when a predetermined phase relation exists between the voltages of the generator and the line. Preferably the automatic synchronizer 532 is arranged to effect the closing of the circuit breaker 305 only when both the frequency difference and phase difference between the voltages of the generator 11 and the system 304 are less than predetermined values. As indicated, the synchronizer 532 includes contacts 538 which when closed complete an energizing circuit for the control contactor 539. The energizing circuit for the contactor 539 may be traced from the negative of the source of supply through line 541, contact arm 554 of the control relay 318, contact finger 266 of the drum controller, segments 226 and 227, contact finger 267 of the drum controller, through the closed contacts 542 of the field failure responsive relay 428, the closed contact 543 of the device 462, closed contact 544 of the device 291, line 545, through the contact 538 of the synchronizer 532, through the winding of the relay 539 and line 546, to the positive of the source of supply. As the relay 539 picks up, its arm 547 locks the relay in around the contact 538 of the synchronizer while its arm 548 completes an energizing circuit for the circuit breaker operating solenoid 306. The latter circuit extends from the energized drum contact finger 267 through the closed contacts 542 and 543 of the relays 428 and 462, respectively, line 513, to the closed contact 548 of the device 539, line 549, the closed contacts of the emergency circuit breaker tripping device 540, the winding of the circuit breaker closing solenoid 306, to the positive of the source of supply. Relay 551, connected between line 549 and the positive supply line is also energized upon the pick-up of relay 539. As the relay 551 picks up its arm 552, a holding circuit for the circuit breaker coil 306 is established around the contact 548 of the control relay 539 from drum finger 267, through contacts 542 of relay 428 through line 553, arm 552 of relay 551 to line 549.

It will be noted that as the circuit breaker 305 is actuated to the closed position, its auxiliary contacts 292 are opened to disrupt the energizing circuit for the device 291. As the device 291 drops out, its contacts 320 and 441 close to complete circuits that will be described later, its contact 476 will move to the open circuit position, deenergizing the voltmeter 464, while its contacts 555 close to complete an energizing circuit for the drum controller motor 191 whereby the drum is advanced to the "running" position. This circuit extends from the drum controller segment 225 through the contact finger 265, the closed contacts 555 of the device 291, connection 557, line 377, through the winding of the drum motor control contactor 327 to the negative of the source of supply. As the contactor 327 picks up, its arm 328 connects the drum controller motor across the supply lines as previously described whereupon the drum will be advanced to the end of the segment 225.

It will be noted that as the drum controller was shifted to the running position, the segment 220 disengaged the associated contact finger 260, thereby deenergizing the solenoid 123 and allowing the valve 122 to move to the closed position thereby cutting off the steam to the high pressure packing. The drum controller in its new position completes an energizing circuit extending from the segment 216 and contact finger 256 for the operating solenoids 126, 128, and 81 for moving the high pressure packing leak-off valve 125 to the closed position, the drain valve 127 to the closed position, and the governor latch 78 to the releasing position, respectively.

Segment 210 of the drum controller through the contact finger 256 connects the voltage and load control of the main generator to push buttons on the supervisor's cabinet. The push buttons 561 and 562 are arranged for adjusting the turbine governor synchronizing spring through the control of the motor 76. To increase the generator load, the button 561 is depressed thereby completing a circuit for the contactor 563 which picks up its arm 564 to complete a circuit extending from the energized drum controller finger 256, line 565, contact 564 of the contactor 563, lines 566, 526, the closed contact 527 of the master control relay 316, line 528 for winding 529 of the motor 76. When the generator load has been sufficiently increased, the button 561 may be released thereby deenerigizing the contactor 563 which drops out to deenergize the motor 76. Similarly, if it is desired to decrease the generator load, the button 562 may be depressed thereby energizing the contactor 567 which will pick up its contact 568 to complete an energizing circuit extending from the energized line 565 through line 569 to the winding 530 of the synchronizing spring adjusting motor 76. When the generator load has been suitably diminished, the button 562 may be released thereby deenergizing the contactor 567 and, accordingly, the motor 76.

The voltage of the generator may be controlled by manipulation of the buttons 571 and 572. To raise the generator voltage, the button 571 may be depressed thereby completing a circuit from the energized line 565 through line 573 for the contactor 481 which, as previously described, picks up to energize the winding 483 of the rheostat motor 482 to decrease the resistance in the generator field circuit. Upon the predetermined increase of the generator voltage, the button 571 may be released thereby arresting further adjustment of the rheostat. Similarly, to decrease the generator voltage, the button 572 may be depressed thereby completing a circuit from the energized line 565 through line 574 for the contactor 488 which picks up to complete an energizing circuit for the field winding 492 of the rheostat motor 482. The rheostat 425 will thereupon be adjusted so as to increase the amount of resistance in the exciter circuit, thereby decreasing the voltage of the generator. Upon a predetermined decrease of the generator voltage, the button 572 may be released thereby stopping the further adjustment of the rheostat.

The supervisor may effect a shut down of the power plant by turning the control switch 312 to the open circuit or stop position. This will deenergize the relay 316 which will drop out and close its contacts 588 to connect the intermittent switch 357 of the tapping device 340 to operate the governor synchronizing spring motor 76 in the unloading direction. This control circuit may be traced from the energized contact finger 256 of the drum controller through line 565, the closed contact 588 of the relay 316, through line 581, the contacts of the intermittent switch 357, lines 582, 569, to the field winding 530 of the motor 76. The motor 76 will be operated rather slowly depending upon the adjustment of the contacts of the intermittent switch 357 until the turbine governor is adjusted to the no-load position. It is to be understood, of course, that during the unloading of the turbine, the generator field excitation should be properly adjusted by means of control buttons 571 and 572 so that the generator will carry its approximate proportion of wattless component. At the no-load position of the governor, the switch 84 associated with the governor beam will open thereby deenergizing the master control contactor 318. As the contactor 318 drops out, its contacts 554 move open, thus breaking the energizing circuit for the circuit breaker operating solenoid 306 causing the circuit breaker 305 to drop to the open circuit position and disconnect the generator from the line. The contact arm 583 of the master control contactor 318 establishes a circuit which will advance the control drum to the shutting down position. This latter circuit extends from the drum controller segment 211 through the contact finger 251, through the closed contact 583 of the relay 318, line 377, to the drum motor control relay 327. The drum operating motor will advance the control drum to the end of the segment 211, the shutting down position.

The field excitation is disconnected from the generator when the main circuit breaker is opened. With the opening of the circuit breaker 305, the circuit breaker position responsive device 291 is energized again, which will cause the opening of its contact 441 and which, in turn, will effect the deenergization of either field contactor 415 or 418, disconnecting the excitation from the generator and connecting the discharge resistor 448 across the generator field. The dropout of either contactor 415 or 418 will deenergize the operating solenoid 160 of valve 159 to shut off the generator air cooling water. Segment 208' of the drum controller will engage with the contact finger 248, completing an energizing circuit for the tripping solenoid 62. As previously described, the energization of this device will result in movement of the throttle valve 15 to the closed position.

The drum controller in moving to the shutting down position deenergizes the contact finger 244 by shifting the end of segment 204 therefrom. Relay 323 is thereupon deenergized which drops out to deenergize the drum segment 213 and the associated control relays for the various pieces of auxiliary apparatus to restore them to the inoperative position. The motors for the air pump, water pump, and condensate pump of the condenser are deenergized. Stop valve 14 is closed, and the condenser vacuum breaker valve 148 is opened. By the disconnection of contact finger 256 from the drum segment 216, the high pressure packing leak-off valve 125 is opened, the drain valve 127 is opened, and the latch 78 is released to reengage with the end of the floating lever 72 of the governor mechanism. When the condenser vacuum rises to substantially atmospheric pressure, the vacuum responsive device 153 will open its contact 155 to shut off the high and low pressure packing water and the cooling water supply to the oil cooler.

In this position of the controller, segment 212 thereof engages with the contact finger 252 to energize the time delay relay 595 which is so adjusted that it will not pick up until after the turbine has stopped. At the end of the time delay of the relay 595, it closes its contact arm 586 to connect finger 252 of the drum to line 377 which will energize the drum motor 191 to advance the drum to the end of segment 212 which is the off position. As the end of the controller drum segment 205 disengages the contact finger 245, the oil pump 91 which has been maintained in operation as long as the turbine was rotating is shut down.

This description of the operation of the control system proceeded from the start upon the assumption that the throttle valve and the associated apparatus were initially in the set position. It will be observed, however, that following a shutdown operation as described above, the trip valve 52 is released in the shutting down position of the drum upon the engagement of segment 208' with the contact finger 248. It is obvious that before a subsequent starting can take place in the manner described, it is necessary that the throttle valve control mechanism be first reset. For this purpose a segment 206" is provided on the drum controller which in the start position thereof engages with the contact finger 246 to complete a circuit through the position switches 46 and 63 for the relay 388. In a manner as previously described, the relay 388 when energized closes the contact 389 to effect the energization of the directional winding 390 of the motor 33, which, in turn, will restore the trip valve 51 to the set position. When this occurs the position switch 63 associated with the trip valve 51 will move to the open circuit position, deenergizing the relay 388 and stopping the motor 33. The position switches 64 and 65 of the trip valve will be moved to the closed circuit position and the various position switches 41 to 46, inclusive, of the throttle valve control mechanism will be restored to the proper positions so that the starting sequence may take place in the manner described.

If, during the running operation of the power plant, a pre-emergency condition occurs such as a predetermined drop in the pressure of the steam supplied to the turbine, or upon a slight rise in temperature of the generator, the power plant will be shut down in substantially the same manner as described above. Upon the opening of the contacts of the pre-emergency devices such as the contacts 162 and 169 of the devices 161 and 168, respectively, the circuit for the relay 316 will be opened just as though the supervisory control switch 312 were opened.

It will be noted that in the event the pre-emergency condition disappears before the generator is completely unloaded and before the governor beam contacts 84 are opened, the shut down of the turbine may be precluded by the pressing of the button 313. Thus, for example, suppose that the contact 162 of the steam pressure responsive device 161 had opened indicating an insufficiency of steam for carrying the instant load. During the subsequent unloading of the generator and throttling of the admission valve 16, the steam pressure might build up again to close contact 162. Therefore the floorman by pressing button 313 before governor beam contact 84 opens can cause relay 316 to pick up again and stop further unloading of the generator and preclude a complete shut down of the turbine.

In the event of other more serious defects occurring during the operation of the power plant such as a loss of condenser vacuum or oil pressure, the power plant will be shut down without first removing the load from the generator. Thus upon the opening of contact 154 of the condenser vacuum responsive device 152 or contact 108 of the oil pressure responsive device 106, the holding circuit for the master control contactor 318 will be broken to cause that contactor to drop out and close its contact 583 to effect the shifting of the drum controller to the shut-down position. At the same time, the opening of the contact 554 will effect the opening of the main circuit breaker 305, thereby disconnecting the generator from the line.

Upon the occurrence of an extreme emergency or vital abnormal condition of operation of the power plant, the main line circuit breaker will be tripped immediately as well as the turbine throttle valve, and the various auxiliaries except the oil pump will also be immediately shut down. Thus, for example, upon the opening of either contact 170 of the generator temperature responsive device 168, contact 113 of the bearing temperature responsive device 111 or contact 295 of the generator voltage responsive device 296, the relay 323 as well as the master control contactor 318 will be deenergized. As described above, the dropout of the master control contactor will effect the immediate tripping of the main line circuit breaker and the shifting of the drum controller to the shutting down position. Upon the dropout of relay 323 its contact arm 326 in its lowermost position will establish a circuit from the supply line 310 through lines 500, 501 for energizing the tripping solenoid 62 to cause immediate closure of the throttle valve 15. The contact arm 326 of relay 323 moving from its upper contact deenergizes the drum controller segment 213 and accordingly, all of the various power plant auxiliary units energized therethrough.

It is to be understood that in a final embodiment of the invention, a suitable auxiliary annunciator system may be incorporated in the control system for the purpose of keeping both the supervisor and the floorman fully informed as to the progress of the starting and running operation of the power plant. Such annunciator systems, however, are not broadly new in the art and since it is not an essential part of the present control scheme, it has been omitted in order to limit this specification to a description of the more essential phases of the control system.

Having described the principle of operation of our invention, we desire to have it understood that the apparatus shown is merely illustrative and that the invention may be carried out by other means.

What we claim as new and desire to secure by Letters Patent of the United States, is:

1. In combination an elastic fluid turbine, valve means for admitting operating fluid to said turbine, means for adjusting said valve means in the open direction for accelerating said turbine slowly from standstill to normal running speed, governor means for regulating the flow of operating fluid to said turbine during normal running operation of said turbine, means for restraining said governor means in a predetermined intermediate position during the starting of said turbine, and means rendering the restraining means ineffective and to permit operation of the governor means at a predetermined turbine speed.

2. In an automatic control system for an elastic fluid turbine, a first valve for controlling the supply of operating fluid to said turbine, means for adjusting said valve slowly in the open direction for accelerating said turbine from standstill to normal running speed, a second valve in series with the first valve for regulating the supply of operating fluid to said turbine, a turbine speed governor for adjusting said second valve during normal running operation of said turbine, means for holding said second valve in a predetermined partly closed position during starting, and means for releasing said holding means to allow movement of said second valve in the opening direction at a predetermined normal operating speed of the turbine.

3. In an automatic control system for an elastic fluid turbine, means for giving a start and stop indication thereto, a speed governor driven by said turbine, a first means controlled by said governor during normal running operation of said turbine for regulating the supply of elastic fluid thereto, a second means in series with the first means for controlling the flow of elastic fluid to said turbine independently of said governor, means responsive to a start indication for operating said second means for relatively slowly accelerating said turbine from standstill to normal running speed, and means responsive to a predetermined abnormal condition pertaining to said turbine for shutting off the supply of steam to said turbine independently of the condition of adjustment of said second means or said governor.

4. In an automatic control system for a prime mover, means for giving start and stop indications thereto, a governor mechanism, a valve normally adjustable by said governor mechanism for regulating the flow of operating fluid to said prime mover during normal running operation thereof, a second valve for controlling the supply of operating fluid to said prime mover, motor means for operating said second valve, tripping means for closing said second valve independently of the valve open condition of adjustment of said motor, means responsive to a stop indication for releasing said tripping means, and means for resetting said tripping means.

5. In an automatic control system for a prime mover, means for giving start and stop indications thereto, a governor mechanism, valve means normally adjustable by said governor mechanism for regulating the supply of operating fluid to said prime mover during normal running operation thereof, a second valve in series with said valve means for controlling the supply of operating fluid to said prime mover, a servo-motor for operating said second valve, means including an electric motor for controlling the valve opening operation of said servo-motor, tripping means for causing closure of said second valve, means responsive to a stop indication for effecting the release of said tripping means to cause shut down of said prime mover, and means responsive to a start indication for causing said electric motor to first reset said tripping means.

6. In a control system for a prime mover, means for giving start and stop indications thereto, a valve for controlling the supply of operating fluid to said prime mover during the starting and stopping operations thereof, actuating means for opening said valve, tripping means for causing the closure of said valve, means responsive to a start indication for causing periodic energization of said operating means and progressive opening movements of said valve, means responsive to a predetermined intermediate condition of speed of said prime mover during the starting thereof for effecting release of said tripping means, and means for causing the resetting of said tripping means and conditioning said control system for continuation with the automatic starting procedure.

7. In a control system for a prime mover, a governor mechanism, a valve adjustable by said governor mechanism for normally regulating the supply of operating fluid to said prime mover during normal running operation thereof, a second valve for controlling the supply of operating fluid to said prime mover, actuating means for opening said second valve, a tripping means for said second valve to cause the closure thereof, means responsive to a predetermined abnormal condition of operation of said prime mover during the running operation thereof for releasing said tripping means, and means for releasing said tripping means during starting operation of said prime mover for testing the operability of said tripping means and said second valve.

8. In a control system for a prime mover, means for giving start and stop indications thereto, a governor mechanism, a valve adjustable by said governor mechanism for normally regulating the supply of operating fluid to said turbine during normal running operation thereof, a second valve for controlling the supply of operating fluid to said prime mover, actuating means for opening said valve, means responsive to a start indication for energizing said actuating means, a tripping means for causing closure of said second valve, means responsive to a predetermined abnormal condition of operation of said prime mover during the running operation thereof for releasing said tripping means, means responsive to a stop indication on said system for causing the release of said tripping means, and means responsive to a predetermined normal condition of operation of said prime mover during the starting thereof for releasing said tripping means.

9. In combination, an elastic fluid turbine, a valve for controlling the flow of operating fluid thereto, means for automatically adjusting said valve relatively slowly in the opening direction by increments at spaced intervals of time, means for automatically tripping said valve closed upon said turbine reaching approximately full speed, means responsive to a predetermined decrease in the turbine speed for readjusting said valve rapidly to an intermediate opened position, and means for automatically effecting relatively slow adjustment of said valve to the full open position.

10. In combination with an elastic fluid turbine having a control valve, means for automatically starting said turbine including means for automatically adjusting said valve to a predetermined intermediate open position for causing said turbine to rotate at a predetermined intermediate speed, and means for automatically effecting adjustment of said admission valve to a wider opened position after a predetermined period of operation of said turbine at said intermediate speed.

11. In an electrical control system for a prime mover, a valve for controlling the admission of operating fluid to said prime mover, means for effecting gradual opening of said valve to accelerate said prime mover to a first predetermined intermediate speed, means for effecting the tripping of said valve to the closed position upon said prime mover reaching said speed, means for effecting the reopening of said valve relatively rapidly to a position somewhat less than said intermediate speed position, and means for effecting the gradual adjustment of said valve to a second higher predetermined prime mover speed position.

12. In an electrical control system for an elastic fluid turbine having an elastic fluid admission control valve, means for effecting the operation of said valve to a predetermined open position for admitting fluid to said turbine for heating the same without causing said turbine to rotate, means for automatically effecting adjustment of said valve to a further open position to cause rotation of said turbine, and means for effecting the closure of said valve upon said turbine being rotated at a predetermined relatively slow speed.

13. In combination a prime mover having a valve for adjusting the supply of operating fluid thereto, an operating motor for said valve, a pilot motor for controlling said operating motor for step by step operation, an electrical controller for said pilot motor, and means including a plurality of limit switches operatively associated with said pilot motor for stopping said pilot motor in predetermined positions of said valve.

14. In an automatic control system for a power plant comprising a prime mover and motor driven auxiliary apparatus, means for sequentially starting said auxiliary apparatus and said prime mover, and means responsive to a predetermined abnormal condition of operation of said auxiliary apparatus for precluding the starting of said prime mover by said first-mentioned means.

15. In an automatic control system for a prime mover power plant including an oil pump, means for starting said oil pump, means including a device responsive to a predetermined oil pressure for enabling the starting of said prime mover plant, said oil pressure responsive device being effective for immediately shutting down said prime mover either during starting or running operation thereof upon a predetermined drop in oil pressure, and means for maintaining said oil pump in operation during shutting down operation of said power plant until said prime mover is stopped.

16. An automatic control system for a prime mover power plant including an oil pump, means for initially starting said oil pump, means for precluding the starting of said prime mover until the occurrence of a predetermined condition of operation of said oil pump, and means responsive to excessive prime mover bearing temperature for effecting shut down of said power plant independently of said last-mentioned means.

17. In an automatic prime mover power plant starting and stopping control system, a controller having a plurality of positions said controller in each of said position establishing circuits for effecting a predetermined series of power plant starting operations, means responsive to a completion of a predetermined series of operations for shifting said controller to a check position, and means for advancing said controller for effecting the next succeeding series of operations.

18. In an automatic prime mover power plant starting and stopping control system, a controller having a plurality of operative positions, said controller in each of said positions establishing circuits for effecting a predetermined series of power plant operations, a motor for operating said controller, means responsive to a completion of each of said series of power plant operations for energizing said motor to shift said controller to the next successive contact making position, and signalling means automatically operable in the event that a predetermined group of series of power plant operations is not completed within a predetermined period.

19. In an automatic prime mover power plant starting and stopping control system, a controller having a plurality of contact making positions, said controller in each of said positions establishing circuits to effect a predetermined series of power plant operations, a motor for shifting said controller progressively from one contact making position to the next, means responsive to a predetermined completion of each of said predetermined series of operations for energizing said motor to shift said controller to the next successive position, and means responsive to a predetermined abnormal condition of operation of said power plant for causing the continuous energization of said motor to shift said controller directly to a power plant shutdown position.

20. In a system for controlling a power plant comprising a prime mover and a generator coupled thereto, a switch for connecting said generator to a line load, means for regulating said prime mover so as to increase the line load carried by said generator, means responsive to a first predetermined abnormal condition of operation of said power plant for automatically effecting the gradual unloading of said generator, means responsive to the continuance of said abnormal condition of operation for effecting the disconnection of said generator from said line and subsequent shutdown of said prime mover, and other means for maintaining the operation of said prime mover upon termination of such abnormal condition prior to the disconnecting of the generator.

21. An automatic control system for a power plant comprising a prime mover having a generator and an exciter coupled thereto, valve means for controlling the supply of operating fluid to said prime mover, control means for said valve means for accelerating said prime mover from standstill to substantially normal running speed, means responsive to a predetermined exciter potential for effecting the connection of said exciter to the field of said generator, an auxiliary source of excitation, means effective upon the failure of proper exciter potential for causing the connection of said auxiliary source of excitation to the field of said generator, means responsive to the generator potential for varying the excitation connected thereto to adjust the generator potential to a predetermined value.

22. In an automatic control system for a power plant comprising a prime mover having a generator and an exciter coupled thereto, valve means for controlling the supply of operating fluid to said prime mover, control means for operating said valve relatively slowly for accelerating said prime mover from standstill to substantially normal running speed, means responsive to a predetermined exciter potential during an intermediate speed condition of said prime mover for effecting the connection of said exciter to the field of said generator, a contact making voltmeter responsive to the generator potential, means responsive to a predetermined substantially normal running speed condition of said prime mover for connecting said voltmeter for regulating the generator potential by varying the exciter potential.

23. In an automatic control system for a power plant comprising a prime mover having a generator and an exciter coupled thereto, said generator being connectable to a line valve means for controlling the supply of operating fluid to said prime mover, control means for said valve means for accelerating said prime mover from standstill to substantially normal running speed, means for connecting said exciter to the generator field during an intermediate speed condition of said prime mover, a voltage regulator for said generator, means responsive to a predetermined substantially normal speed condition of said prime mover for connecting said regulator for regulating the generator voltage by adjustment of the excitation voltage, a speed governor operatively associated with said prime mover valve means, means responsive to a differential indication of line and generator voltages for adjusting said governor means responsive to a predetermined relationship between the generator and line voltages for effecting the connection of said generator to said line, and means responsive to the connection of said generator to said line for deenergizing said voltage regulator.

24. In an automatic control system for a prime mover power plant including an elastic fluid turbine, a generator and an exciter coupled to said turbine and motor driven auxiliary apparatus, manually operable means for effecting first the energization of said auxiliary apparatus, means responsive to a predetermined condition of operation of said auxiliary apparatus for effecting the starting of said elastic fluid turbine, means responsive to exciter potential during an intermediate speed of said turbine for connecting said exciter to said generator, means responsive to a predetermined voltage condition of said generator for connecting said generator to a line, means responsive to a predetermined abnormal condition of operation of said power plant for effecting first a gradual unloading of said generator and the disconnection thereof from said line, and subsequently the shutdown of said turbine, and means for maintaining said motor driven auxiliary apparatus energized until after the stopping of said turbine.

25. In an automatic control system for a prime mover power plant including a prime mover, a generator and an exciter coupled to said prime mover, and motor driven auxiliary apparatus for said prime mover, manually operable means for effecting the energization of said motor driven auxiliary apparatus, means responsive to a predetermined condition of adjustment of said prime mover and to a predetermined condition of operation of said auxiliary apparatus for effecting the starting of said prime mover, control means for effecting the gradual acceleration of said prime mover to running speed, means for connecting said exciter to the generator field, means responsive to line and generator voltages for effecting connection of said generator to a line, manual control means for said prime mover to adjust generator load, and means responsive to an abnormal condition of operation of said power plant for effecting first an unloading of said generator and subsequently the stopping of said prime mover and ultimately the deenergization of said auxiliary apparatus.

26. In an automatic control system for a prime mover power plant including a turbine, a generator and an exciter coupled to said turbine and motor driven auxiliary apparatus for said turbine, manually operable means for conditioning said system to effect the energization of said motor driven auxiliary apparatus, a first valve for controlling the supply of operating fluid to said turbine during normal turbine running operation, a second valve for controlling the supply of operating fluid during the turbine starting and stopping operations, means responsive to a predetermined condition of operation of said auxiliary apparatus and condition of adjustment of said valves for effecting the opening of said second valve by increments at spaced intervals of time, means responsive to exciter potential for effecting connection of the exciter to the generator field during an intermediate turbine speed condition, a governor responsive to normal turbine running speed for operating said first valve as said second valve is moved to a wide open position, means for connecting said generator to a line, and manually operable means for adjusting said governor so as to regulate generator load.

27. In an automatic control system for a prime mover power plant including an elastic fluid turbine, a generator and an exciter coupled to said turbine and motor driven auxiliary apparatus, a controller having a plurality of positions for effecting a predetermined series of power plants starting and stopping operations, a motor for driving said controller, manual control means for said controller motor for effecting movement thereof to a first position, and means responsive to movement of said controller to said first position for effecting energization of said motor driven auxiliary apparatus, means responsive to a predetermined condition of operation of said auxiliary apparatus for permitting the energization of said controller motor for movement thereof to a second controller position, an elastic fluid admission controlling valve for said turbine and operating means therefor responsive to said controller in the second position thereof for effecting the starting of said turbine and bringing said turbine to substantially normal running speed in a plurality of steps, means for connecting said exciter to the generator field during an intermediate speed condition of said turbine, means for connecting said generator to a line load, means responsive to a predetermined abnormal condition of operation of said power plant for effecting movement of said controller to a further position for automatically effecting first the unloading of said generator and the disconnection thereof from said line load and subsequently a complete shutdown of said prime mover power plant.

28. In an automatic control system for a prime mover power plant including an elastic fluid turbine, a generator and an exciter coupled to said turbine and a motor driven auxiliary apparatus for said turbine, manually operable means for conditioning said system to effect the energization of said motor driven auxiliary apparatus, a first valve for controlling the supply of operating fluid to said turbine, means for automatically adjusting said valve slowly in the opening direction for accelerating said turbine from standstill to its normal running speed, a second valve for regulating the supply of operating fluid to said turbine, a turbine speed governor for adjusting said second valve during normal running operation of said turbine, means for holding said second valve in a predetermined partly closed position during starting, means for actuating said holding means so as to allow movement of said second valve in the opening direction after said turbine reaches normal running speed, means responsive to a predetermined abnormal condition of operation of said power plant during starting of said turbine for effecting movement of said first valve to a closed position, means responsive to exciter potential for effecting connection of said exciter to said generator during an intermediate speed condition of said turbine, means responsive to generator voltage for effecting connection of said generator to a line, manually operable means for adjusting said governor during normal running operation of said turbine to vary the load on said generator, means responsive to a predetermined pre-emergency condition of operation of said power plant for effecting the unloading of said generator, and means responsive to a predetermined emergency condition of operation of said power plant for effecting immediate shutdown of said power plant through closure of said first valve.

TRACY E. JOHNTZ.
CLAUDE W. PLACE.